United States Patent
Einarsson et al.

(10) Patent No.: US 9,641,584 B2
(45) Date of Patent: *May 2, 2017

(54) METHOD AND ARRANGEMENT FOR REPRESENTATION SWITCHING IN HTTP STREAMING

(71) Applicant: Telefonaktiebolaget L M Ericsson (publ), Stockholm (SE)

(72) Inventors: Torbjörn Einarsson, Stockholm (SE); Per Fröjdh, Stockholm (SE); Clinton Priddle, Carindale (AU); Zhuangfei Wu, Danderyd (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,894

(22) Filed: Nov. 9, 2015

(65) Prior Publication Data

US 2016/0065639 A1    Mar. 3, 2016

Related U.S. Application Data

(63) Continuation of application No. 13/579,553, filed as application No. PCT/SE2011/050166 on Feb. 16, 2011, now Pat. No. 9,185,153.

(Continued)

(51) Int. Cl.
*G06F 15/16* (2006.01)
*H04L 29/06* (2006.01)
(Continued)

(52) U.S. Cl.
CPC ........ *H04L 65/602* (2013.01); *H04L 47/2416* (2013.01); *H04L 65/4084* (2013.01);
(Continued)

(58) Field of Classification Search
USPC ........ 709/231, 236, 205, 207, 201, 202, 203
See application file for complete search history.

(56) References Cited

U.S. PATENT DOCUMENTS 7,222,306 B2    5/2007   Kaasila et al.
8,032,885 B2   10/2011   Fish
(Continued)

FOREIGN PATENT DOCUMENTS

JP    2004134988 A    4/2004
JP    2005252435 A    9/2005
(Continued)

OTHER PUBLICATIONS

3GPP, "Transparent end-to-end packet switched streaming service (PSS)." 3GPP file format (3GP) (Release 9); 3GPP TS 26.244 v9.0.0. Dec. 2009, Sophia Antipolis Valbonne, France, pp. 1-52.

(Continued)

*Primary Examiner* — Lan-Dai T Truong
(74) *Attorney, Agent, or Firm* — Coats & Bennett, P.L.L.C.

(57) ABSTRACT

In a method of enabling representation switching during HTTP streaming sessions in a communication system, arranging available representations into groups, providing information identifying the groups and their respective representations, and switching representation based on the provided group identify information.

22 Claims, 6 Drawing Sheets

Related U.S. Application Data

(60) Provisional application No. 61/305,985, filed on Feb. 19, 2010.

(51) Int. Cl.
  *H04L 29/08* (2006.01)
  *H04L 12/853* (2013.01)
  *H04N 21/2662* (2011.01)

(52) U.S. Cl.
  CPC .............. *H04L 65/80* (2013.01); *H04L 67/02* (2013.01); *H04N 21/2662* (2013.01)

(56) References Cited

U.S. PATENT DOCUMENTS

| | | |
|---|---|---|
| 2005/0249226 A1 | 11/2005 | Kang |
| 2005/0262251 A1 | 11/2005 | Klemets et al. |
| 2007/0022215 A1 | 1/2007 | Singer et al. |
| 2007/0140223 A1 | 6/2007 | Bhatia et al. |
| 2007/0290787 A1 | 12/2007 | Fiatal et al. |
| 2008/0052306 A1 | 2/2008 | Wang et al. |
| 2008/0056663 A1 | 3/2008 | Tsujii et al. |
| 2008/0192736 A1 | 8/2008 | Jabri et al. |
| 2009/0031384 A1* | 1/2009 | Brooks ............ H04N 21/23439 725/127 |
| 2009/0328228 A1 | 12/2009 | Schnell |
| 2010/0106838 A1 | 4/2010 | Segev et al. |
| 2010/0138486 A1 | 6/2010 | Yang et al. |
| 2010/0153831 A1 | 6/2010 | Beaton |
| 2010/0169459 A1 | 7/2010 | Biderman et al. |
| 2011/0173619 A1 | 7/2011 | Fish |
| 2012/0016917 A1* | 1/2012 | Priddle ................ H04N 5/91 707/827 |

FOREIGN PATENT DOCUMENTS

| | | |
|---|---|---|
| JP | 2005328268 A | 11/2005 |
| JP | 2007536796 A | 12/2007 |
| JP | 2009503950 A | 1/2009 |
| JP | 2011526136 A | 9/2011 |
| WO | 03098475 A1 | 11/2003 |
| WO | 2010007513 A1 | 1/2010 |

OTHER PUBLICATIONS

Nokia Corporation, "Fragmented Time Indexing of Representations." S4-AHI126, 3GPP TSG-SA4 Ad-Hoc Meeting, Dec. 14-16, 2009, Paris, France, pp. 1-4.

Qualcomm Europe, et al., "Pseduo CR: Adaptive HTTP Streaming in PSS—Data Formats for HTTP-Streaming excluding MPD." S4-AHI128, 3GPP TSG-AHI meeting #nn, Paris, France, Dec. 13-15, 2009, pp. 1-8.

Qualcomm Europe, et al., "Pseduo CR: Adaptive HTTP Streaming in PSS—Client Behaviour." S4-AHI129, 3GPP TSG-AHI meeting #nn, Paris, France, Dec. 13-15, 2009, pp. 1-3.

Qualcomm Europe, et al., "Adaptive HTTP Streaming in PSS—Discussion on Options." S4-AHI130, 3GPP TSG-SA4 Ad-Hoc Meeting, Dec. 14-16, 2009, Paris, France, pp. 1-7.

Telefon AB LM Ericsson, et al. "Media Presentation Description for HTTP Streaming." 3GPPSA4-MBS SWG on MBS_Ext, Tdoc S4-AHI116, Dec. 14-16, 2009, Issy Les Moulineaux, France, pp. 1-4.

Qualcomm Incorporated. "Adaptive HTTP Streaming: Media Presentation Description." 3GPP TSG-SA4 #57, S4-100061, St. Julians, Malta, Jan. 25-29, 2010, pp. 1-14.

Qualcomm Incorporated, "Pseduo CR: Adaptive HTTP Streaming—Full Solution Proposal." 17 pages. S4-100060, 3GPP TSG-SA4 #57, St. Julians, Malta, Jan. 25-29, 2010.

3GPP. "Reply Liaison Statement on Adaptive HTTP Streaming." 2 pages. Tdoc S4-100197, 3GPP TSG-SA4 #57 meeting, St. Julians, Malta, Jan. 25-29, 2010.

* cited by examiner

METHOD AND ARRANGEMENT FOR REPRESENTATION SWITCHING IN HTTP STREAMING

CROSS-REFERENCE TO RELATED APPLICATIONS

The present application is a continuation of U.S. application Ser. No. 13/579,553, which is the national stage entry under 35 U.S.C. 371 of international application no. PCT/SE2011/050166, filed Feb. 16, 2011, which in turn claims the benefit of U.S. provisional application No. 61/305,985, filed Feb. 19, 2010, each of which applications are incorporated herein by reference in their entirety.

TECHNICAL FIELD

The present disclosure concerns communication networks in general, specifically to methods and arrangements enabling improved representation switching during HTTP streaming sessions in such networks.

BACKGROUND

There is an increased interest in HTTP (HyperText Transfer Protocol) streaming of media content, in particular video. Recently, this has evolved beyond simple progressive download to give two new features: adaptivity and live content. The way this is achieved is that the content is partitioned into multiple segments, or files, each corresponding to a small interval of content, for example 10 seconds of content. The client is provided with a manifest file or equivalent file which lists the different segments and where to fetch them and the client fetches them one by one. The split into different segments/files that are fetched via a standard web protocol like HTTP, is also said to be cache-friendly, or CDN (Content Distribution Network) friendly, since it does not require any state in the server or cache, in contrast to streaming servers based on protocols like RTSP (Real Time Streaming Protocol). Multiple levels are possible with intervals and segments. For example, one could do ad insertion, by changing the content during one interval, and then get back to the content stream in the next interval.

Adaptivity is achieved by providing multiple versions e.g. representations of the media content, so that a client can choose to fetch the version which it estimates to be the best given the network performance/download time. From the client's point of view, adaptivity is most easily solved if the segments of the different versions have the same duration, so that the client can simply make a decision for each segment download on which version to choose.

A client node taking part in a HTTP streaming session is faced by two major difficulties. Firstly, in order to enable an optimal streaming session, it is necessary for the client to be able to efficiently and seamlessly switch from one representation to another. This ensures an optimal playback quality of the media session, without unnecessary buffering or downtime, while at the same time ensuring an efficient utilization of available resources. Thus, the client needs to be able to perform representation switching in a reliable and beneficial manner. Secondly, a client is faced with the choice of multiple available representations of a same media segments, and thus needs to be able to, at each moment in time, select the representation that provides the optimal viewing experience. Thus, the client needs to be able to select an optimal representation for its current session.

Based on the above, there is a need for enabling an optimal choice of representations for a client during a streaming session of media as well as a need to enable efficient representation switching for the client.

SUMMARY

The present disclosure aims to obviate some of the above-mentioned problems, and present improved representation switching during HTTP streaming sessions.

A first aspect of the present disclosure presents a method of enabling representation switching during HTTP streaming sessions in a communication system, including the steps of: arranging available representations into groups, providing information identifying the groups and their respective representations; and switching representation based on the provided group identify information.

A second aspect of the present disclosure presents a method in a HTTP server node, including the steps of: arranging available representations into groups, and providing information identifying the groups and their respective representations to a client node A third aspect of the present disclosure presents a method of representation switching in a HTTP client node including the steps of: receiving information identifying groups comprising one or more representations of media content, and selecting and switching representation based on the provided group identity information.

A fourth aspect of the present disclosure presents a HTTP streaming server node, which node includes a group arranging unit configured to arrange available representations into groups, and an information provider configured to provide information identifying the groups and their respective representations to a HTTP client.

A fifth aspect of the present disclosure presents a HTTP streaming client node, which node includes a group identity receiver configured to receive information identifying groups comprising one or more representations of media content, and a representation switch configured to select and switch representation based on the provided group identity information.

Advantages of the present disclosure include enabling a client to select and switch to an optimal representation during a HTTP streaming session.

BRIEF DESCRIPTION OF THE DRAWINGS

The invention, together with further objects and advantages thereof, may best be understood by referring to the following description taken together with the accompanying drawings, in which.

DETAILED DESCRIPTION

Throughout the drawings, the same reference numbers are used for similar or corresponding elements.

As stated in the background, there is a need for enabling an optimal choice of representations for a client during a streaming session of media as well as a need to enable efficient representation switching for the client. In order to enable an optimal streaming session the client needs to be able to efficiently and seamlessly switch from one representation to another. This ensures an optimal playback quality of the media session, without unnecessary buffering or downtime, while at the same time ensuring an efficient utilization of available resources. In addition, a client is faced with the choice of multiple available representations of a same media segments, and thus needs to be able to, at each moment in time, select the representation that provides the optimal viewing experience. Thus, the client needs to be able to select an optimal representation for its current session.

It has been identified by the inventors, that both the above mentioned scenarios can be assisted and alleviated by providing an exchange or signal of information between a client and a server, or between a client and an intermediate support node, about the available representations and any information enabling the client to perform efficient representation switching and to select an optimal representation. The information can preferably be signaled in a so called manifest file between the server and receiving client. Another alternative is to provide the information via some intermediate support node.

The first aspect of the invention is a server to client signaling of characteristics of the HTTP streaming segments. In general, there may be many representations, for example, to cover many different devices, resolutions, or different codecs. The client can of course choose freely among all the different representations, but to achieve the best results, and smooth switching between the representations, we introduce signaling in the manifest file that simplifies the switching process for clients. This is done by the concept of grouping representations into "groups".

Figure 1:
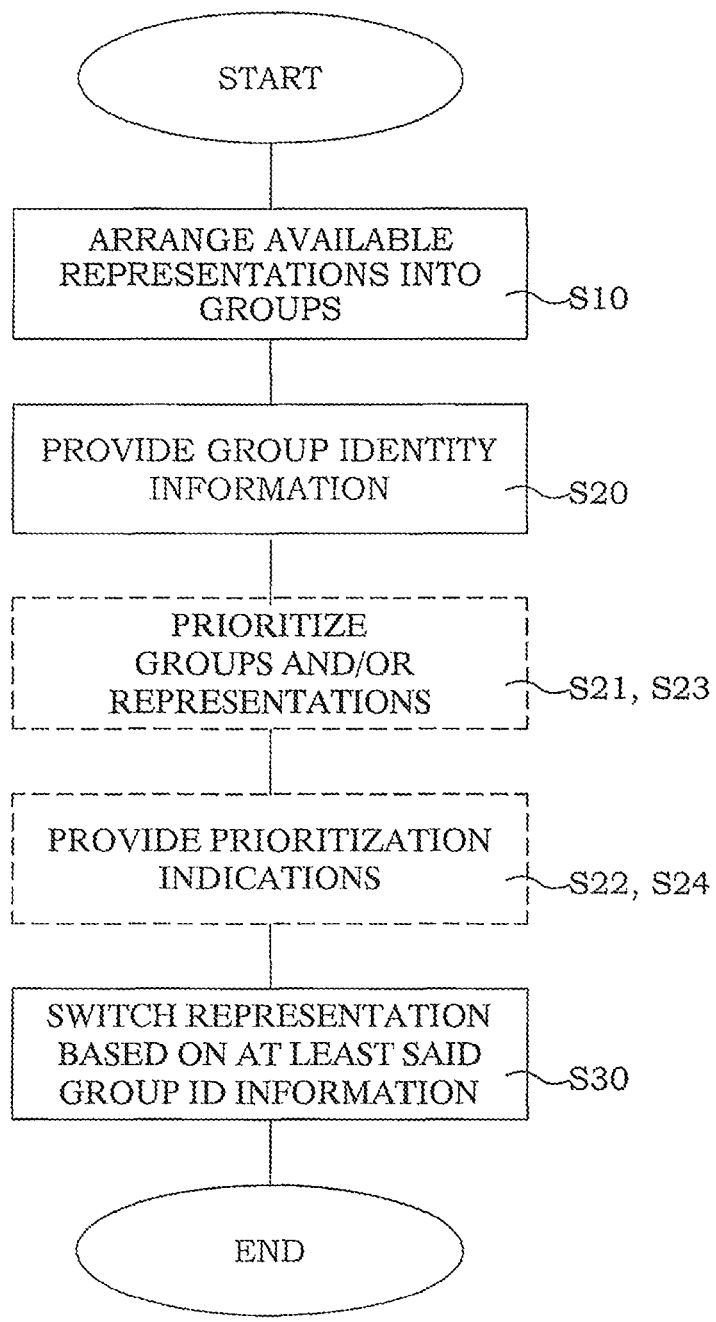
FIG. 1 is a flow chart of an embodiment of a method according to the present disclosure.

An embodiment of a method according to the present disclosure will be described with reference to FIG. 1. Initially, the available representations are arranged S10 into groups. The arrangement can be performed by means of tagging each representation with e.g. a switching ID based on a set of predefined group tags identifying particular characteristics of each segment. Such tags can indicate e.g. that it is possible to switch (or not) between representations of the group at segment boundaries or elsewhere during playback. An example of representations being tagged with a same switching ID that indicates that switching is possible at segment boundaries are two representations differing only in bitrate. Another contrasting example of representations arranged within a group with a same switching ID that indicate that switching is not appropriate can include representations with different languages or aspect ratios.

The information e.g. switching ID, identifying the representation groups and their representations is provided S20 to a streaming client node or intermediate node, for example in a manifest file. Subsequently, the client then switches S30 from a current representation to a new or preferred representation based on the provided group identity information e.g. switching ID or switching tag.

Further, another group (and switching ID or tag) is defined to signal or indicate that switching can be performed on the bitstream level at segment boundaries. One such example of when switching is not possible is when there is a prediction across segment borders.

Figure 5:
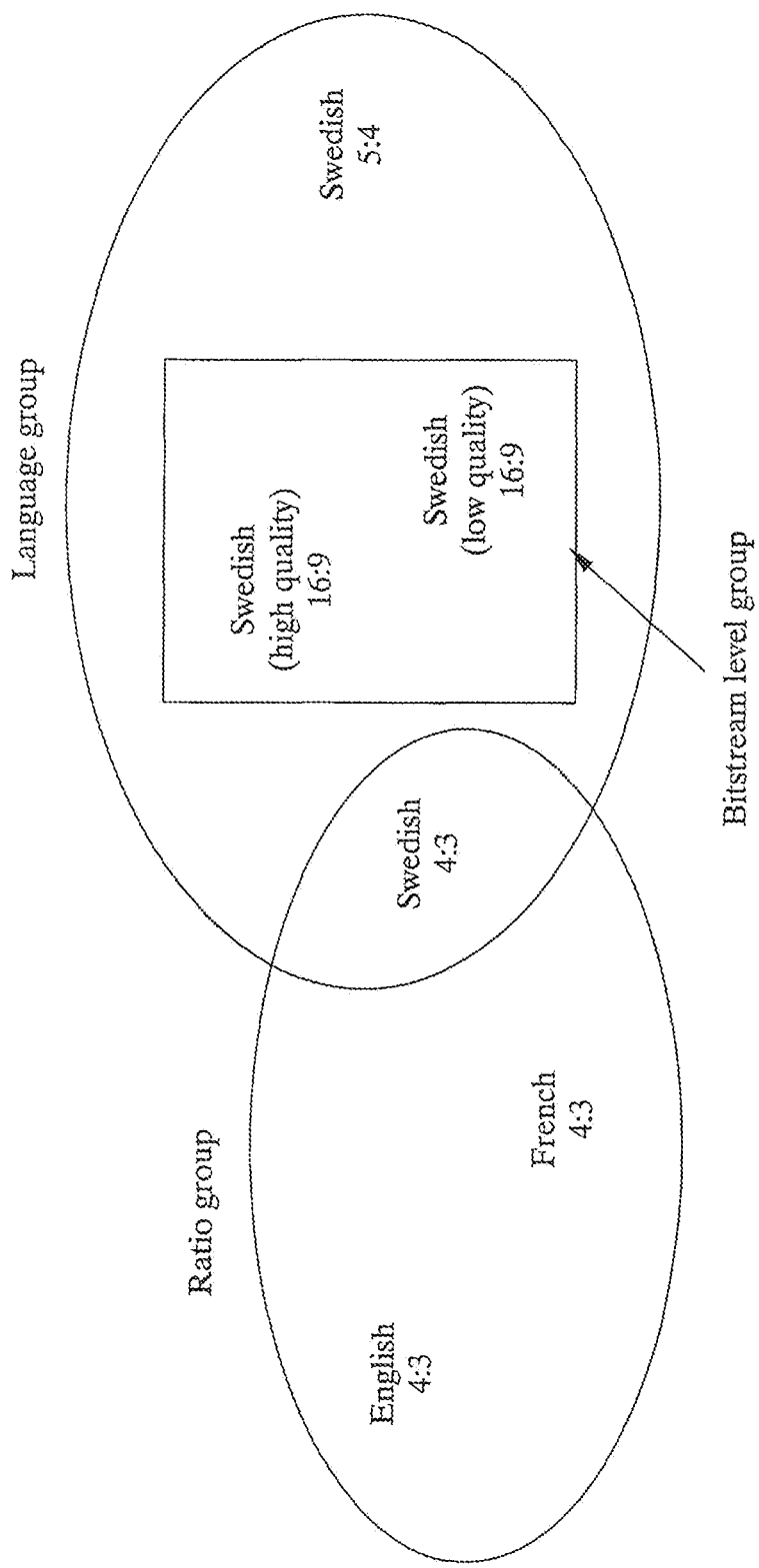
FIG. 5 illustrates different representations.

Examples of various groups are illustrated in FIG. 5. In the figure, there are shown 3 different groups, namely a ratio group (all segments have the same aspect radio of the video), a language group (all representations belong to the same language), and a bitstream level group (representations only differ in bitrate). As indicated in the figure, one representation can be identified with a plurality of switching IDs, e.g. can belong to different groups.

Consequently, the client is able to perform representation switching in a more efficient manner, due to the added information in the manifest file, which improves the viewing or listening experience.

As mentioned previously, a second aspect is when there are a number of available representations provided at the server side, it is not always clear to the client which is the best option to select. For instance, when bandwidth allows, one tends to choose the presentation with highest bitrate. However, this is not always correct when for example, two video are of similar quality, the high bitrate video is MPEG-2 coded and low bitrate video is H.264 coded.

Also with reference to FIG. 1, a further embodiment of a method according to the present disclosure will be described. As indicated earlier, when faced with a plurality of available representations, albeit tagged or grouped representations, a client still needs to be able to make an optimal representation selection.

Accordingly, the available representations can be prioritized S21, S23, either by prioritizing the groups S21, or by prioritizing S23 representations within each group, or a combination of both. An indication of the prioritization order can then be provided S22, S24 together with the switching ID or tag, or separately, to the client. Thus, enabling the client to select an optimal representation.

As an example, prioritization ordering is signaled under different tags in the manifest file. An ordering is a list of server recommendations where the top representation on the list is considered the best choice. The priority of representation goes down sequentially as indicated by the list. A tag signaling goes with ordering representing under what criterion this ordering is managed.

Figure 2:
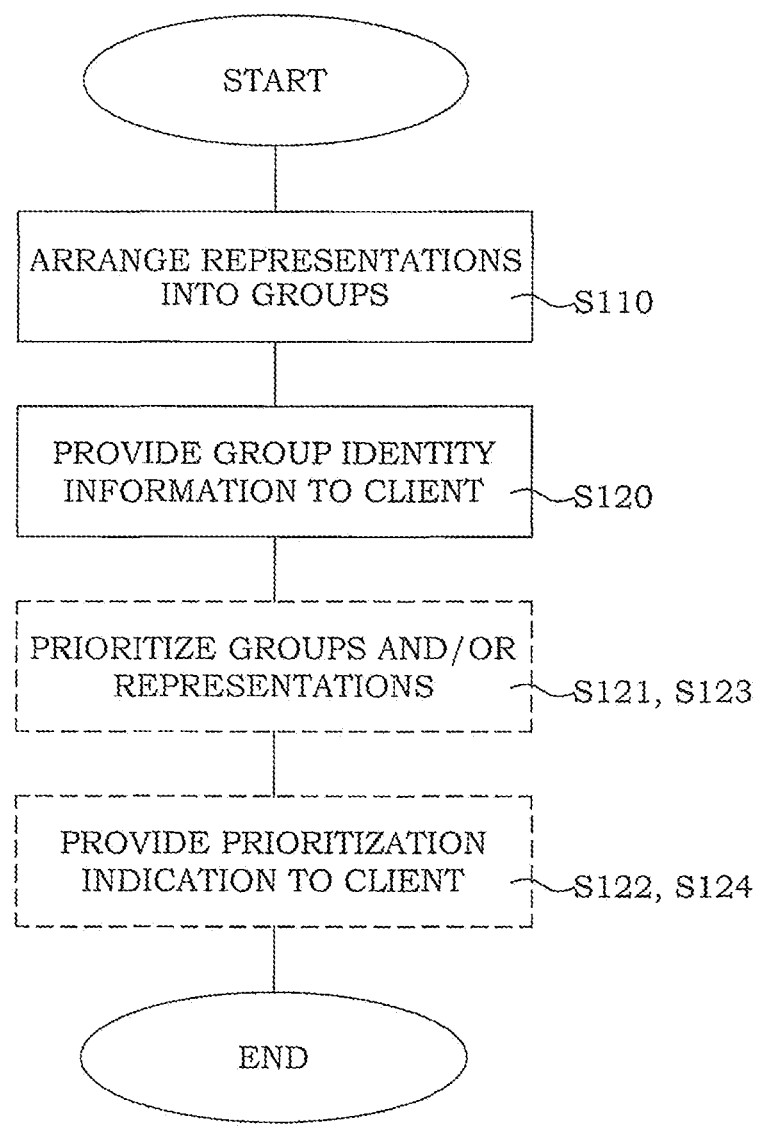
FIG. 2 is a flow chart of an embodiment of a method in a server node according to the present disclosure.

With reference to FIG. 2, embodiments of a method in a streaming server node will be described. In a corresponding manner to the above, a plurality of available representations are tagged and arranged in groups S110 based on a respective switching ID or tag indicating that segment switching is possible at segment borders (or not), or that bitstream switching is possible, or some other tag or switching ID. The group identity information or switching ID or tag is provided to a client node, to enable the client to select an optimal representation.

According to a further embodiment, the various representations and/or groups can be prioritized S121, S123, and an indication about the priority can be provided S122, S124 to the client. The priority indication can be a simple list indicating a preferred order of selecting representations within or between groups. Preferably, the indication about prioritization is provided to a client in the manifest file or similar.

Below will follow a couple of examples of embodiments of a method in a HTTP streaming server node.

Firstly, the server node, or rather the person/system managing the content creation process in the node, may group S110 content it considers switchable during playback together and signaling S120 this. Secondly, the server node may choose, depending on factors such as client friendliness, to encode and segment the bitstreams in such a way that splicing is possible on the bitstream level, i.e. without reconfiguring the decoder. This is also signaled.

Thirdly, the server node may perform an ordering S121, S123 both within and without a switch group. There are many alternatives on how the ordering can be carried out under different tags, namely:

Sorting based on computer analysis (complexity, bitrate . . . )

Expert recommendation, could be computer engineer/ network expert/artist/movie critic . . .

Sponsor intervention. Rank the video higher if there are no commercials

The server to client signaling S122, S124 is advantageously performed in the manifest file (or media presentation description) of the stream. For the ordering signaling, the client can negotiate with server node on what types of tag ordering it needs and the server may send the list on demand.

Figure 3:
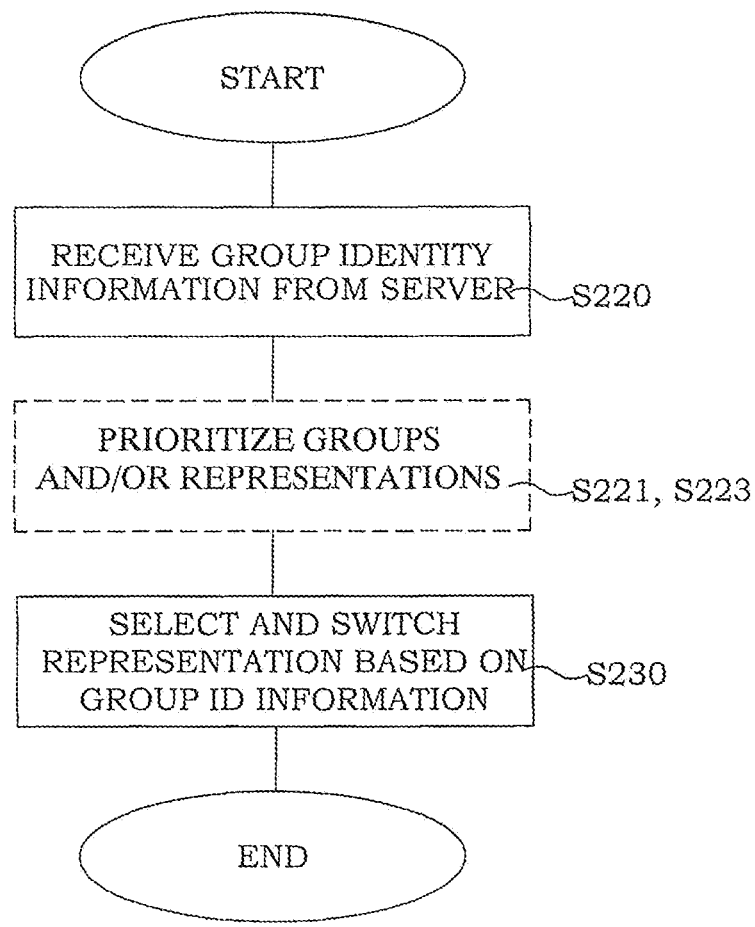
FIG. 3 is a flow chart of an embodiment of a method in a client node according to the present disclosure.

Embodiments of methods for representation switching in a client node will be described with reference to FIG. 3. During playback e.g. during a streaming session, the client node receives S220 information identifying groups of representations of media content. Based on the received information, the client then selects a next representation and switches S230 from its current representation to the selected representation. Further, the client node can perform a prioritization S221, S223 or ordering of the received representations or groups of representations based on some predetermined quality criteria, and select its subsequent representation based on the priority indication. The prioritization can be performed by the client node, or be supplied from the server node (either as a mandatory element in the manifest file, or upon request from the client node).

The selection and switching step can be performed based on a comparison between a current switching ID and the selected representation. According to one embodiment, if the current representation and the selected or preferred representation share a common switching ID, then the switch can be performed immediately at a subsequent segment border. Or, if the current and selected representations do not share a common switching ID, then a decoder can be reinitialized in response to the switch.

Below will follow a few examples of embodiments in a client node according to the present disclosure.

For segment switching, and during playback of a HTTP Streaming session, the client may choose to adapt on segment borders, or at other fixed points of time. When choosing to adapt, the client may do the following:

1) Create a list of representations that have the same switching ID (i.e. belong to the same group)

2) From this list of representations, choose the best representation that fulfils the current set of criteria (e.g. bitrate, codec supported, etc).

For bitstream switching (same resolution, same codec and profile/level, no prediction cross the switching boundary) and during playback of a HTTP Streaming session, the client may choose to adapt on segment borders. When choosing to adapt, the client may do the following:

1) Create a list of representations that have the same switching ID

2) From this list of representations, choose the best representation that fulfils the current set of criteria (e.g. bitrate, codec supported, etc)

3) If the new and old representations are in the same bitstream switching group, the new bitstreams segments may be sent to the decoder without further action (i.e. no decoder teardown). If the new and old representations belong to different bitstream switching groups, the decoder must be reinitialized on this switch. This may involve downloading new metadata, or selecting alternative decoder which is capable of decoding bitstream with higher profile/ level (complex bitstream).

Note, point 3 may be considered already under point 2 when the client chooses representation, i.e., switching group can be added to the set of criteria. Finally, during playback, and even initial startup, the client may have a number of representations to choose between with different characteristics. The client may do the following to choose which representation to play:

1) Create a list of representations that fulfills the current set of criteria (e.g. bitrate, codec supported, etc)

2) From this list of representations, choose the one with the highest representation order. Alternatively, the representation order can aid in the decision of representation in combination with other factors.

The abovementioned signaling may be either implicit or explicit. For example, a default value may be specified.

Figure 4:
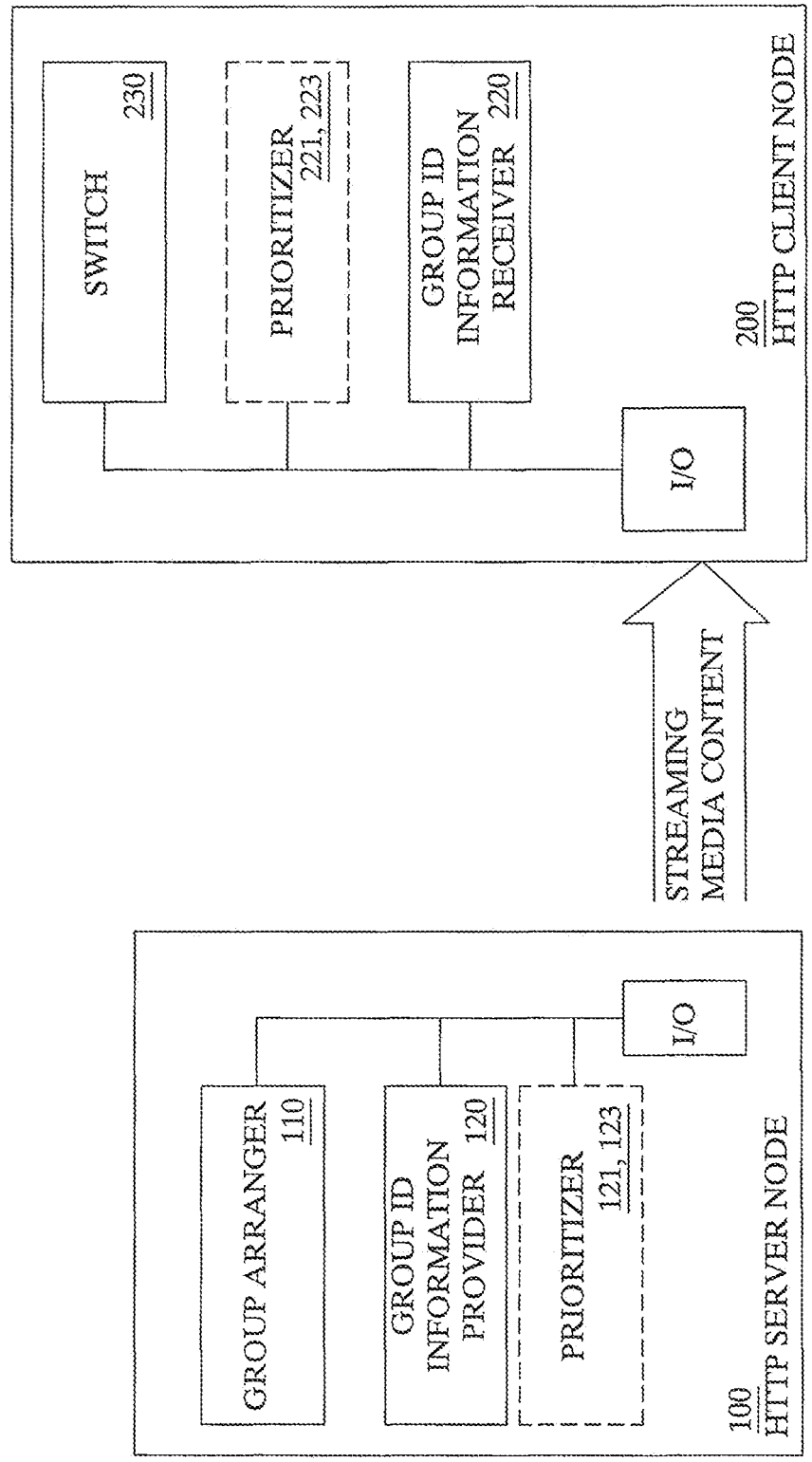
FIG. 4 is an embodiment of a server node and a client node according to the present disclosure.

A few embodiments of a system including at least one HTTP streaming server node 100 and at least one HTTP streaming client node 200 will be described with reference to FIG. 4. As indicated by the arrow marked STREAMING MEDIA CONTENT connecting the server node 100 and the client node 200, the two units are involved in a streaming session, wherein the client node 200 is fetching or collecting the content of a certain current representation from the server node 100.

A HTTP server node 100 according to the present disclosure includes in addition to a general input/output unit I/O, a group arranging unit 110 for arranging or grouping the available representations into groups. The arranging unit 110 is configured to provide each representation with a respective switching ID or tag identifying the representation as belonging to one or more of a plurality of available groups. Further, the server node 100 includes an information provider 120, which provides information identifying the groups and their representations to a HTTP client node 200 involved in a streaming session with the server node 100.

Further, according to a particular embodiment, the server node 100 includes one or both of a group prioritizer 121 for ordering or prioritizing the groups and providing an indication about the priority together with the switching ID, and a representation prioritizer 123 for prioritizing or ordering representations within each group and providing and indication about the prioritization, preferably to a client node 200 or other intermediate node.

A HTTP streaming client node 200 according to the present disclosure includes in addition to a general input/ output unit I/O, a group identity receiver 220 configured to receive information identifying groups comprising one or more representations of media content, and a switch 230 configured to select and switch representation based on the provided group identity information.

Further, according to a particular embodiment, the HTTP streaming client node 200 includes one or both of a group prioritizer 221 for ordering or prioritizing the groups and providing an indication about the priority together with the switching ID, and a representation prioritizer 223 for prioritizing or ordering representations within each group. In addition, the switch 230 is adapted to switch representation additionally based on the prioritization information.

The steps, functions, procedures, and/or blocks described above may be implemented in hardware using any conventional technology, such as discrete circuit or integrated circuit technology, including both general-purpose electronic circuitry and application-specific circuitry.

Alternatively, at least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

Figure 6:
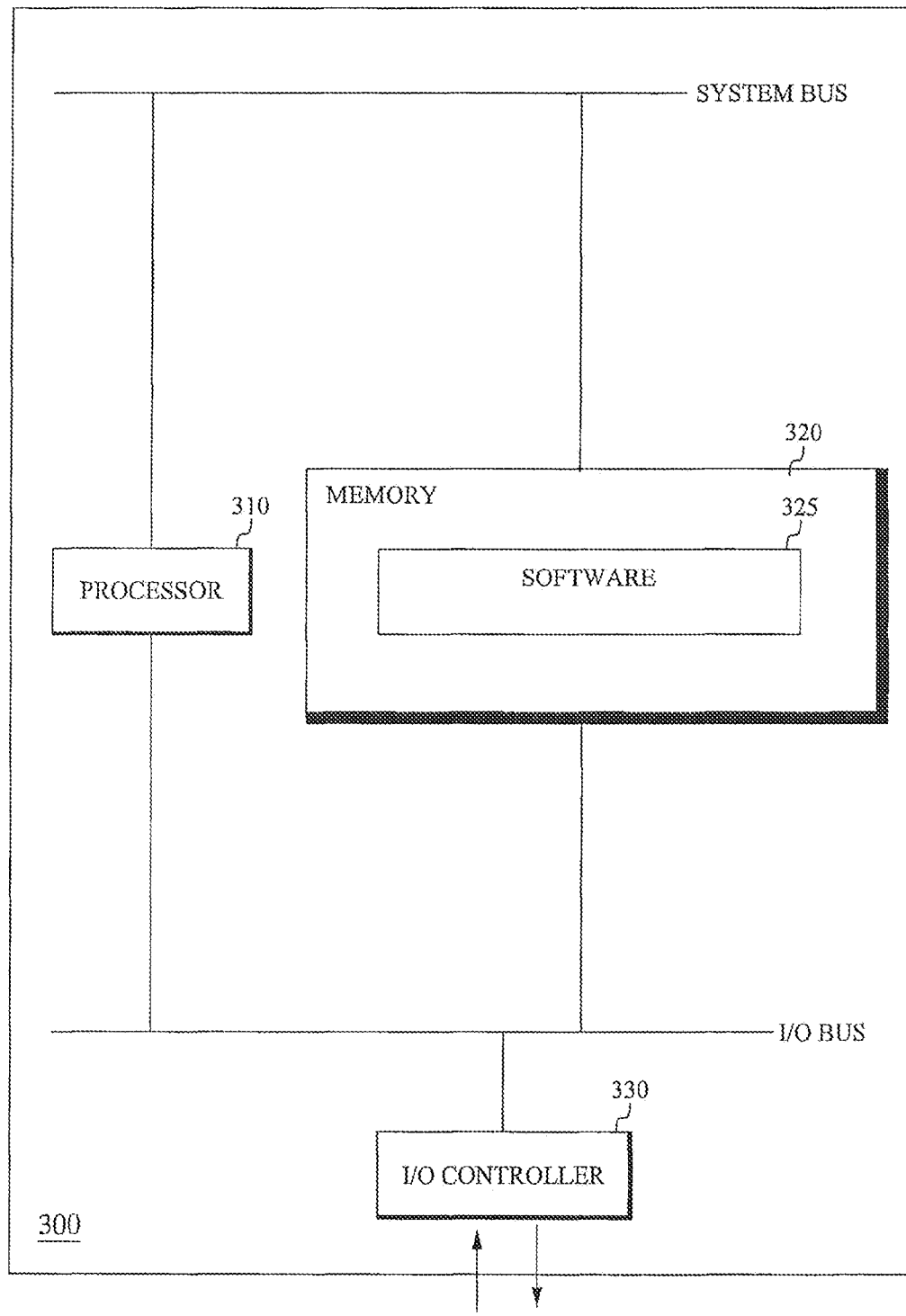
FIG. 6 illustrates a schematic implementation of the present disclosure.

In the following, an example of a computer-implementation will be described with reference to FIG. 6. A computer 300 comprises a processor 310, an operating memory 320, and an input/output unit 330. In this particular example, at least some of the steps, functions, procedures, and/or blocks described above are implemented in software 325, which is loaded into the operating memory 320 for execution by the processor 310. The processor 310 and memory 320 are interconnected to each other via a system bus to enable normal software execution. The I/O unit 330 may be interconnected to the processor 310 and/or the memory 320 via an I/O bus to enable input and/or output of relevant data such as input parameter(s) and/or resulting output parameter(s).

By applying the various embodiments of the present disclosure, it is possible for a client to select an optimal representation for the media content of a current HTTP streaming session.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for enabling switching between different versions of the same media content during streaming of the media content from a server node to a client node, the method implemented in the server node and comprising:
   identifying, by the server node, multiple different groups into which the same media content is arranged, wherein each group comprises multiple different switchable versions of the same media content that are switchable during streaming of that media content, with each version being segmented into multiple segments; and
   sending signaling from the server node indicating one or more of the different groups and the switchable versions comprised therein.

2. The method of claim 1, further comprising tagging each version with one or more switching identifiers that identify one or more of the different groups to which the version belongs, and wherein said sending comprises sending signaling indicating the one or more switching identifiers with which certain switchable versions have been tagged.

3. The method of claim 1, wherein each group comprises multiple different switchable versions of the same media content that are switchable at segment borders during streaming of that media content without decoder re-initialization.

4. The method of claim 1, wherein each group comprises multiple different switchable versions of the same media content that are bitstream switchable during streaming of that media content without decoder re-initialization.

5. The method of claim 1, further comprising prioritizing among different versions of the same media content at the server node, and sending signaling indicating said prioritizing.

6. The method of claim 1, wherein one of the different groups comprises different versions that represent the same media content in different languages.

7. The method of claim 1, wherein one of the different groups comprises different versions that represent the same media content at different bitrates or aspect ratios.

8. The method of claim 1, wherein the server node is an HTTP server node, and wherein said streaming comprises HTTP streaming.

9. The method of claim 1, wherein the sending comprises sending, to a client node, signaling from the server node indicating a plurality of the multiple different groups.

10. A method implemented in a client node for switching between different versions of the same media content during streaming of the media content from a server node to the client node, the method comprising:
    receiving from the server node signaling indicating one or more of multiple different groups into which the same media content is arranged, wherein each group comprises multiple different switchable versions of the same media content that are switchable during streaming of that media content, with each version being segmented into multiple segments; and
    while receiving a first version of the media content streamed from the server node to the client node, switching to receiving a second version of the media content streamed from the server node, based on said signaling.

11. The method of claim 10, wherein said signaling indicates one or more switching identifiers with which certain switchable versions have been tagged, wherein each version is tagged with one or more switching identifiers that identify one or more of the different groups to which the version belongs.

12. The method of claim 10, wherein each group comprises multiple different switchable versions of the same media content that are switchable at segment borders during streaming of that media content without decoder re-initialization.

13. The method of claim 10, wherein each group comprises multiple different switchable versions of the same media content that are bitstream switchable during streaming of that media content without decoder re-initialization.

14. The method of claim 10, wherein said switching comprises selecting, at the client node, the second version from switchable versions that, according to the signaling, belong to the same group as the first version.

15. The method of claim 10, wherein said switching comprises prioritizing the switchable versions of the media content based on signaling received from the server node indicating how to prioritize those switchable versions, and selecting the second version based on the prioritization.

16. The method of claim 10, wherein said switching comprises selecting, at the client node, the second version from switchable versions that, according to the signaling, belong to a different group than the first version, and reinitializing a decoder for performing said switching.

17. The method of claim 10, wherein the client node is an HTTP client node, and said streaming comprises HTTP streaming.

18. A client node configured for switching between different versions of the same media content during streaming of the media content from a server node to the client node, said client node comprising a processor and a memory, said memory containing instructions executable by the processor whereby the client node is configured to:
receive from the server node signaling indicating one or more of multiple different groups into which the same media content is arranged, wherein each group comprises multiple different switchable versions of the same media content that are switchable during streaming of that media content, with each version being segmented into multiple segments; and
while receiving a first version of the media content streamed from the server node to the client node, switch to receiving a second version of the media content streamed from the server node, based on said signaling.

19. The client node of claim 18, wherein said signaling indicates one or more switching identifiers with which certain switchable versions have been tagged, wherein each version is tagged with one or more switching identifiers that identify one or more of the different groups to which the version belongs.

20. The client node of claim 18, wherein each group comprises multiple different switchable versions of the same media content that are switchable at segment borders during streaming of that media content without decoder re-initialization.

21. The client node of claim 18, wherein each group comprises multiple different switchable versions of the same media content that are bitstream switchable during streaming of that media content without decoder re-initialization.

22. The client node of claim 18, wherein the memory contains instructions executable by the processor whereby the client node is configured to select the second version from switchable versions that, according to the signaling, belong to the same group as the first version.

* * * * *